(12) United States Patent
Rodriguez et al.

(10) Patent No.: US 11,059,279 B2
(45) Date of Patent: Jul. 13, 2021

(54) ADHESIVE TAPE APPLICATOR

(71) Applicant: Sandar Industries, Inc., Atlantic Beach, FL (US)

(72) Inventors: Peter A. Rodriguez, Jacksonville, FL (US); Victor Rodriguez, Jacksonville, FL (US); Craig Austin, Jacksonville, FL (US)

(73) Assignee: Sandar Industries, Inc., Atlantic Beach, FL (US)

( * ) Notice: Subject to any disclaimer, the term of this patent is extended or adjusted under 35 U.S.C. 154(b) by 0 days.

(21) Appl. No.: 16/867,033

(22) Filed: May 5, 2020

(65) Prior Publication Data
US 2020/0353739 A1 Nov. 12, 2020

Related U.S. Application Data

(60) Provisional application No. 62/844,349, filed on May 7, 2019.

(51) Int. Cl.
*B65H 35/00* (2006.01)
*B32B 38/10* (2006.01)

(52) U.S. Cl.
CPC ......... *B32B 38/10* (2013.01); *B65H 35/0033* (2013.01); *B65H 35/0066* (2013.01); *B65H 35/0073* (2013.01); *B65H 2701/3772* (2013.01)

(58) Field of Classification Search
CPC ............ B65H 35/0066; B65H 35/0073; B65H 35/0033
See application file for complete search history.

(56) References Cited

U.S. PATENT DOCUMENTS

| | | | | |
|---|---|---|---|---|
| 3,565,727 | A * | 2/1971 | Guest | B65H 35/0033 156/527 |
| 4,582,558 | A * | 4/1986 | Antonson | B60B 7/00 156/523 |
| 4,880,152 | A * | 11/1989 | Trankle | B65H 35/0026 224/162 |
| 2002/0185512 | A1* | 12/2002 | Shah | B65H 35/0026 225/56 |
| 2013/0056020 | A1* | 3/2013 | Wilson | B05C 17/00 132/320 |
| 2016/0207730 | A1* | 7/2016 | Mueller | B65H 35/0086 |
| 2018/0118497 | A1* | 5/2018 | Murphy | B65H 35/0026 |
| 2018/0244487 | A1* | 8/2018 | Zhao | B65H 35/004 |

* cited by examiner

*Primary Examiner* — Alex B Efta
(74) *Attorney, Agent, or Firm* — Rogers Towers, P.A.; Joseph P. Kincart

(57) ABSTRACT

Provided herein are applicators and methods for dispensing adhesive tape. Such adhesive tape applicators include a housing adapted to contain a roll of adhesive tape; a compressible tape hub attached to an inner surface of the housing and adapted to rotatably support the roll of adhesive tape; and an adhesive roller apparatus for applying the adhesive tape to a substrate. The compressibility of the compressible tape hub provides a means of braking and tearing the adhesive tape roll.

10 Claims, 13 Drawing Sheets

ADHESIVE TAPE APPLICATOR

CROSS-REFERENCE TO RELATED APPLICATIONS

This application claims the benefit of U.S. Provisional Application No. 62/844,349, filed May 7, 2019, the contents of which are incorporated herein by reference in their entirety.

FIELD OF THE DISCLOSURE

The present invention relates to the field of adhesive tape applicators and methods of using the same. Such adhesive tape applicators include a housing adapted to contain a roll of adhesive tape; a compressible tape hub attached to an inner surface of the housing and adapted to rotatably support the roll of adhesive tape; and an adhesive roller apparatus for applying the adhesive tape to a substrate.

BACKGROUND OF THE DISCLOSURE

Adhesive tapes and their dispensers have been known in the art for many years. Adhesive tapes may include a backing such as paper, plastic film, cloth, or metal, and an adhesive on one or both sides of the backing. Hand-held tape dispensers are typically designed to allow a user to dispense a length of tape using one hand by securing the start of the tape to a substrate, using the adhesion of the tape to the object to unspool the desired length of tape, then cutting the tape by biasing a saw-like cutter against the tape. Such devices are relatively simple to operate in principle, but in practice, managing the tape and cutting it at the desired length can be problematic as it may be difficult to remove the tape from the roll and keep the tape from doubling back on itself.

Double-sided tape typically includes a liner to prevent the tape from sticking to itself in an adhesive roll. Traditionally, a double-sided tape with a liner is unwound from a roll by hand, a section of the tape is cut, and a first adhesive tape side is applied to a first surface. The liner is then removed from a second adhesive tape side and the second adhesive tape side is attached to a second surface. This process may be inefficient and cumbersome. Other devices for dispensing double-sided adhesive tape have also been known, but such devices typically include a series of gears and wheels that are subject to jamming as the adhesive finds its way into the gears. Some of such devices are also too large for handheld use and may be prohibitively expensive.

There remains a need in the art for hand-held tape dispensers that can reliably affix a length of tape to a substrate. There is also a need for a hand-held tape dispenser that can both reliably affix a length of tape and also efficiently separate a double-sided tape from its liner.

SUMMARY OF THE DISCLOSURE

Accordingly, provided according to embodiments of the invention are adhesive tape applicators and methods of using the same. Such adhesive tape applicators include a housing adapted to contain a roll of adhesive tape; a compressible tape hub attached to an inner surface of the housing and adapted to rotatably support the roll of adhesive tape, and an adhesive roller apparatus for applying the adhesive tape to a substrate.

The compressibility of the compressible tape hub provides a means of braking and tearing the adhesive tape roll. In use, when the desired length of adhesive has been applied, an operator may depress or squeeze the adhesive tape applicator. When the outer face is depressed, thereby compressing the compressible tape hub, the outer face is brought into frictional or forceful contact with the adhesive tape roll, and in some cases with the edge of the adhesive tape roll spool, thus stopping its rotation. This creates a tension between the length of tape being applied to a substrate and the lack of rotation of the adhesive roll. Thus, twisting or lateral motion of the applicator (while the frictional or forceful contact between the outer face and the adhesive roll is maintained) will tear the adhesive at the point of contact with the substrate. When the compressive force is removed, the compressible tape hub and outer surface of the housing may revert back to their non-compressed states, allowing the adhesive tape roll to rotate for the next use.

In some embodiments of the invention, the roll of adhesive tape is a dual-sided adhesive tape includes an adhesive liner releasably attached to one side of the dual-sided adhesive tape. In such embodiments, the applicator may include a liner outlet, and a scraper adjacent to the adhesive roller apparatus. The scraper inserts between the liner and the adhesive to detach the liner from the adhesive and push the liner out of the applicator's housing through the liner outlet.

Also provided in embodiments of the invention are methods of using adhesive tape applicators according to embodiments of the invention. In some embodiments, methods of applying adhesive tape include gripping the first face and the second face of an applicator according to an embodiment of the invention by one hand; rolling a length of adhesive tape onto a substrate with the applicator's transfer roll; compressing the outer face of the applicator to frictionally contact the outer face of the housing with the roll of adhesive tape, thereby halting its rotation; and applying a lateral force to the adhesive tape applicator to create a lateral force on the length of adhesive tape, thereby tearing the adhesive tape on the substrate from the roll of adhesive tape.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION OF EMBODIMENTS OF THE INVENTION

Figure 1:
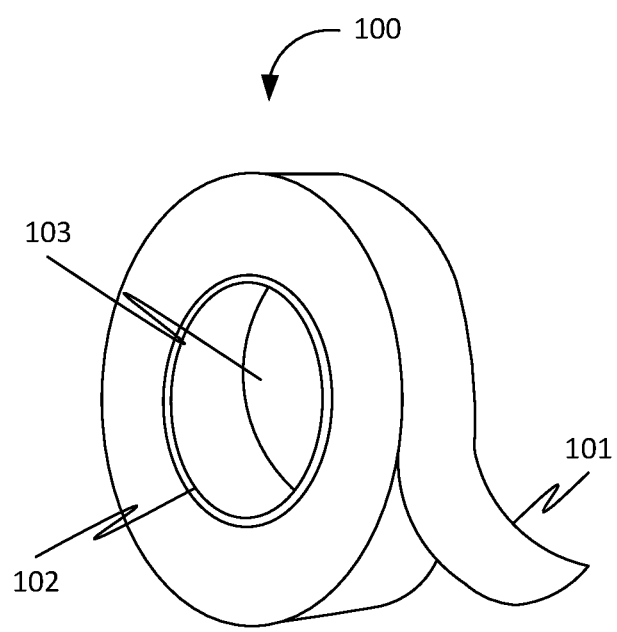
FIG. 1 illustrates an adhesive tape roll that may be used in embodiments of the invention.

Several embodiments of the present disclosure have been described. While this specification contains many specific implementation details, these should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modifications, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising," "including." and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Provided according to embodiments of the invention are adhesive tape applicators and methods of using the same. Such adhesive tape applicators include a housing adapted to contain a roll of adhesive tape; a compressible tape hub attached to an inner surface of the housing and adapted to rotatably support the roll of adhesive tape, and an adhesive roller apparatus for applying the adhesive tape to a substrate. The adhesive tape applicators may further include several other optional elements as described in further detail below.

As used herein, the term "adhesive tape" refers any type of adhesive tape known, including those use for desktop uses, industrial uses, and the like, and may be of any suitable tensile or adhesive strength. In some embodiments, the tape is a repulpable paper tape. In some embodiments, the adhesive tape is a pressure sensitive adhesive tape (PSAT). The adhesive tape may have an adhesive on one or both sides (also referred to as one-sided or dual-sided adhesive tape, respectively). The adhesive tape may further include a liner, also referred to as a release liner, which may be releasably attached to one or both sides of the adhesive tape. Such release liners are generally used with dual-sided adhesive tapes. The release liner may be formed of any material that allows for release from the tape's adhesive by a mechanism described herein, but in some cases, the release liner includes silicone, including a silicone-coated surface.

Referring to FIG. 1, a roll of adhesive tape 100 includes a length of adhesive tape 101 spooled around a spool member 102. The spool member 102 is generally a cylindrical device (although any suitable shape may be used) on which a length of adhesive tape may be wound. In particular embodiments, the spool member 102 is shaped to allow for at least three points of contact with the compressible tape hub (not shown). The spool member 102 includes an aperture 103 defined therethrough, wherein the aperture 103 is sufficiently sized to allow for the compressible tape hub to be inserted therein and pass therethrough. While the aperture 103 of the spool member 102 is typically void, any spool member may be used provided that it allows sufficient space in the aperture 103 for the compressible tape hub to pass therethrough and is configured such that the adhesive tape roll 100 can rotate about the compressible tape hub. In some embodiments of the invention, the spool member 102 is a paper core, such as a laminated paper core. Other materials may be used for the spool member 102, including metal, plastic, and the like.

Figure 2:
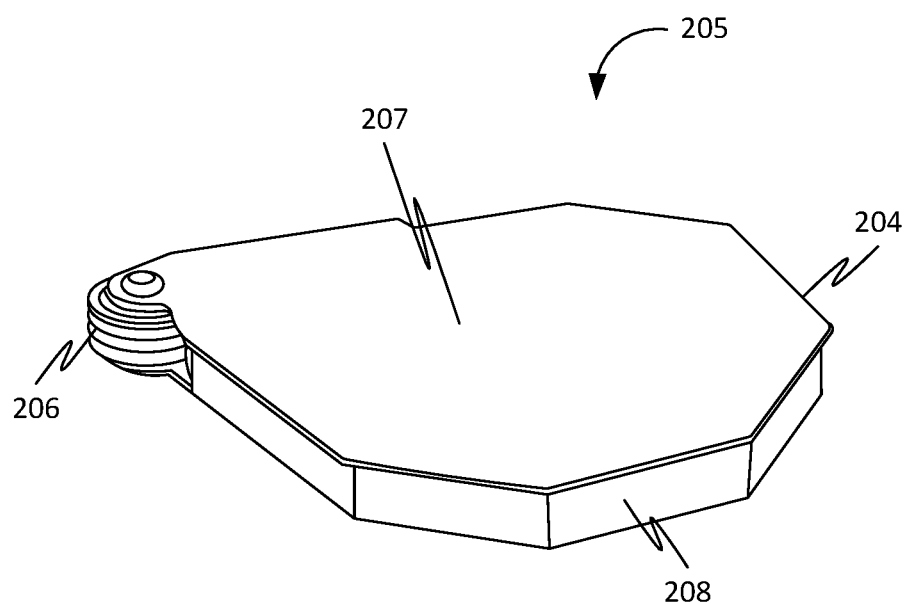
FIG. 2 illustrates an adhesive tape applicator according to an embodiment of the invention.

The housing in which the adhesive roll is contained may take many configurations. Referring to FIG. 2, the housing 204 of an adhesive tape applicator 205 is generally adapted to enclose all or a portion of the adhesive tape roll (not shown) and the compressible tape hub (not shown). The adhesive roller apparatus 206 is attached to the housing 204. A portion of the adhesive roller apparatus 206 may be enclosed by the housing 204 but, as shown in FIG. 2, some or all of the adhesive roller apparatus may be exposed. The housing 204 typically comprises a first face 207 and a second face (not shown) and at least one sidewall 208 connecting the two faces. In some cases, the first face and the second face are substantially flat and substantially parallel to each other. However, numerous other possibilities are envisioned, including housing that is shaped to be gripped by a hand. For example, one face may be shaped to receive a thumb of the operator, a sidewall may be shaped or configured to receive an index finger, and the opposite face may be shaped to receive the remaining fingers. In some embodiments of the invention, a first face 207 or a portion thereof is a cover that may be removed to access the adhesive tape roll, as will be discussed in further detail below.

Figure 3:
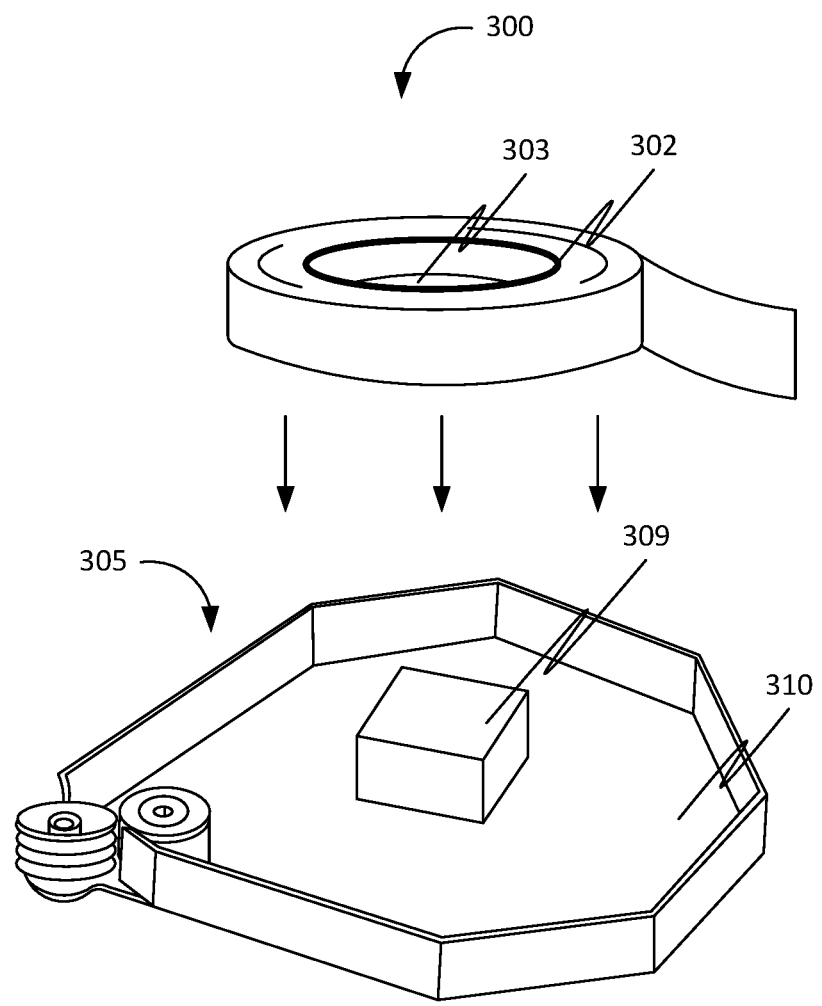
FIG. 3 illustrates how an adhesive tape roll fits within housing of an applicator of an embodiment of the invention.

Referring to FIG. 3, adhesive tape applicator 305 (with the outer face removed) includes compressible tape hub 309 secured to an inner face 310 face of the housing. The compressible tape hub 309 is configured to rotatably support a roll of adhesive tape 300 (sometimes referred to as an adhesive tape roll 300) such that the adhesive tape roll 300 can rotate around the compressible tape hub 309. The compressible tape hub may also provide a drag on the rotation of the tape roll spool member 302, for example, via an interference fit, so that the adhesive tape roll 300 does not rotate too quickly about the compressible tape hub 309. As shown by the arrows in FIG. 3, the compressible tape hub 309 is configured to insert through the aperture 303 of the adhesive tape roll spool member 302. Although the compressible tape hub is shown as square, any suitable shape, including round, polygon, or irregular shaped, may be used provided that the adhesive tape roll 300 can rotate about the compressible tape hub 309.

Figure 4A:
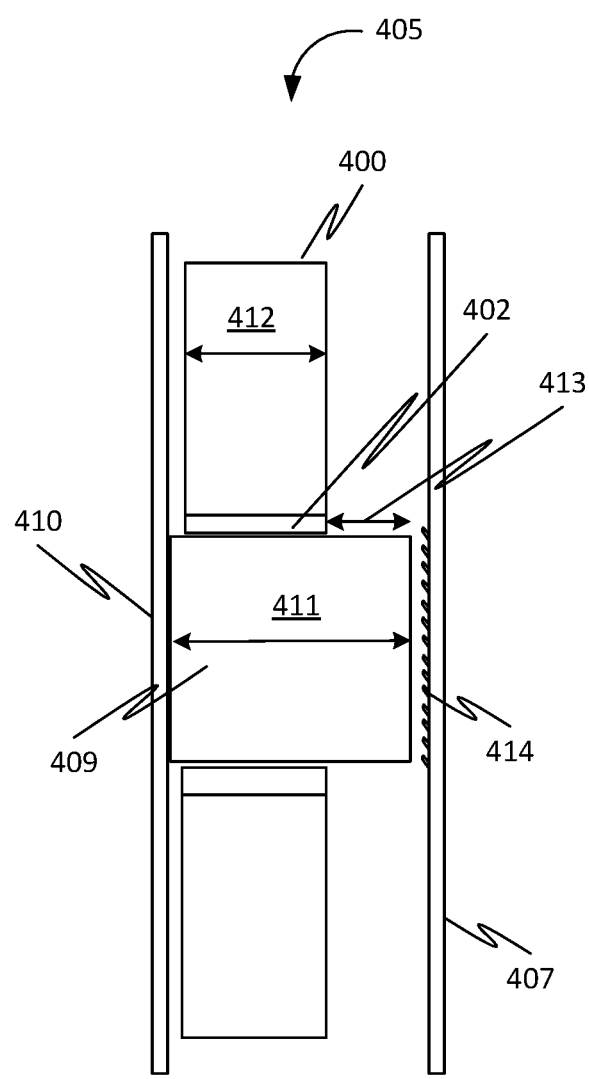
FIG. 4A is a cross-sectional view of a tape dispenser according to an embodiment of the invention when in an uncompressed state.
Figure 4B:
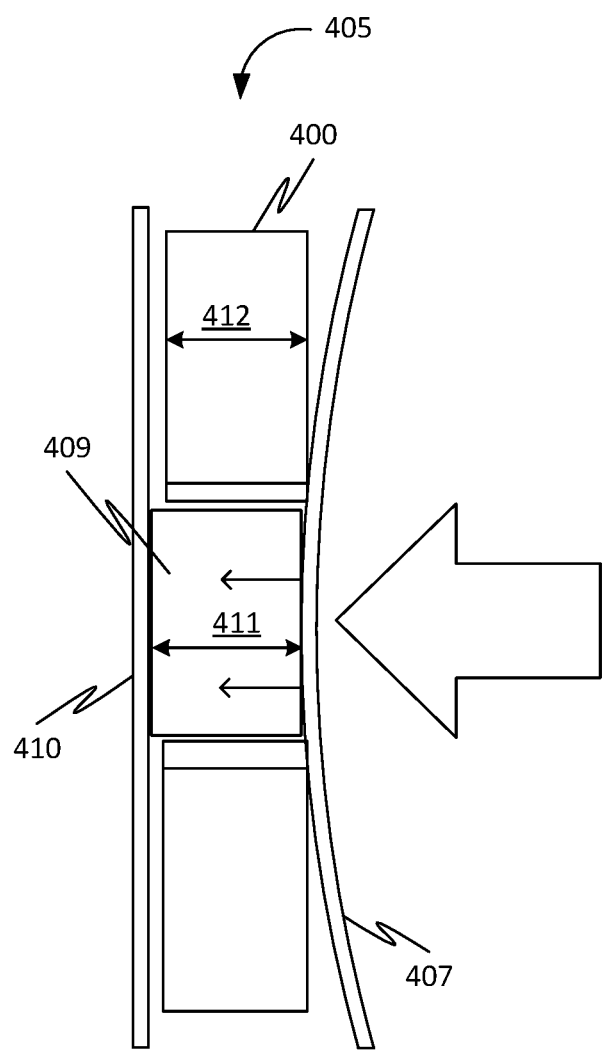
FIG. 4B is a cross-sectional view of a tape dispenser according to an embodiment of the invention when in a compressed state.

FIGS. 4A and 4B show a cross section of an adhesive tape applicator 405 according to an embodiment of the invention and an adhesive tape roll 400 therein. The compressible tape hub 409 is attached to the inner face 410 of the housing, such as, for example, by an adhesive. In an uncompressed state (FIG. 4A), the width 411 of the compressible tape hub 409 is greater than the width 412 of the adhesive tape roll 400. Thus, once the adhesive tape roll 400 is inserted through the compressible tape hub 409, a compressible protrusion 413 from the end of the spool 402 is formed. In FIG. 4A, the compressible protrusion 413 prevents the outer face 407 of the housing from contacting the adhesive tape roll 400. As such, the use of the compressible tape hub 409 both rotatably supports the adhesive tape roll 400 and prevents the outer face 407 of the housing from contacting the adhesive tape roll 400 so that it may rotate. As described above, the compressible tape hub 409 may also engage an inner surface of the spool 402 to create a drag on the rotation of the adhesive tape roll 400.

The compressibility of the compressible tape hub 409 provides a means of braking and tearing the adhesive tape roll 400. The compressible protrusion 413 tends to separate the outer face 407 from the adhesive tape roll 400 when the operator's grip on the applicator 405 is relaxed, as when applying adhesive. Referring to FIG. 4B, when the compressible tape hub 409 is compressed, such as by squeezing the inner face 410 or outer face 407, the outer face 407 frictionally or forcefully contacts the adhesive tape roll 400, which may prevent the adhesive tape roll 400 from rotating about the compressible tape hub 409. In some embodiments, a portion of the inner surface 414 of the outer face 407 may be roughened or otherwise texturized to increase the friction of the applicator 405 against the adhesive tape spool 402, reducing the force necessary to squeeze the outer face 407 enough to stop the adhesive tape roll 400 from turning. In some embodiments, the textured or roughened surface 414 is slightly greater in diameter than the adhesive tape spool 402 exposed to the outer face 407.

In use, when the desired length of adhesive has been applied, an operator may depress or squeeze the outer face 407 of the applicator 405 (FIG. 4B). When the outer face 407 is depressed, thereby compressing the compressible tape hub 409, the outer face 407 is brought into frictional or forceful contact with the adhesive tape roll 400, and in particular, in some cases with the edge of the adhesive tape roll spool 402, thus stopping its rotation, whereupon a twisting or lateral motion of the applicator 405 (while the frictional or forceful contact between the outer face 407 and the adhesive roll 400 is maintained) will tear the adhesive between the applicator 405 and the substrate. When the compressive force is removed from the compressible tape hub 409, the compressible tape hub 409 resumes its non-compressed state and shape and may thereby expand, maintaining the outer face 407 away from adhesive tape roll 400, allowing it to rotate for the next use. The compressible tape hub 409 may force the outer face 407 into an uncompressed position, or the outer face 407 may itself revert to its uncompressed state once the compression is removed.

In some embodiments of the invention, the compressible tape hub 409 includes, consists essentially of, or consists of, a compressible material. The compressible tape hub 409 can include any compressible material that is sufficiently rigid to prevent the outer face 414 from contacting the adhesive tape roll 400 when in an uncompressed state but sufficiently compressible so that the compressible protrusion 413 of the compressible tape hub 409 may be reduced or eliminated by compressing the outer face 407 of the housing with the operator's hand. In some cases, the compressible tape hub 409 comprises a polymer foam. Furthermore, in particular embodiments, the entire compressible tape hub 409 is a polymer foam.

A compressible material on which the adhesive roll rotates may be preferred for its simplicity and combination of locating, friction, and spring functions without separate parts. However, several other configurations of the compressible tape hub 409 are also envisioned as within the scope of the present invention. An alternative embodiment may include a molded hub with flexible fingers radiating in a spiral to engage the inside diameter of the spool aperture to engage the spool and provide friction to prevent free rotation. The engagement of the flexible fingers within the interior of the spool may depend on the radial force applied from a spring member in the center of such a hub, wherein when the spring is compressed, the spring exerts a radial force on the flexible fingers such that they engage the interior of the spool and stop rotation. In another possible configuration of the compressible tape hub 409, a hub may include pivoted petals that may be pushed apart by inserting a spacer into the center of the arrangement such that squeezing the cover would push the spacer into the arrangement and expand the hub to stop the roll from turning. In yet another configuration, an adhesive tape roll may be located by a disk held in place by a thumb screw acting against a spring such that tightening the thumb screw would adjust the pressure and friction to establish the drag necessary to prevent free rotation of the adhesive tape roll, while squeezing the outer face would force the disk against the adhesive tape roll with additional pressure to perform the braking function. All of these embodiments and any others that allow for a compressed state and an expanded state are within the scope of the present invention. However, such alternate embodiments may require more parts, greater manufacturing expense, and more time to assemble, and may have greater ease of failure than a simple hub made of a compressible material.

Figure 5:
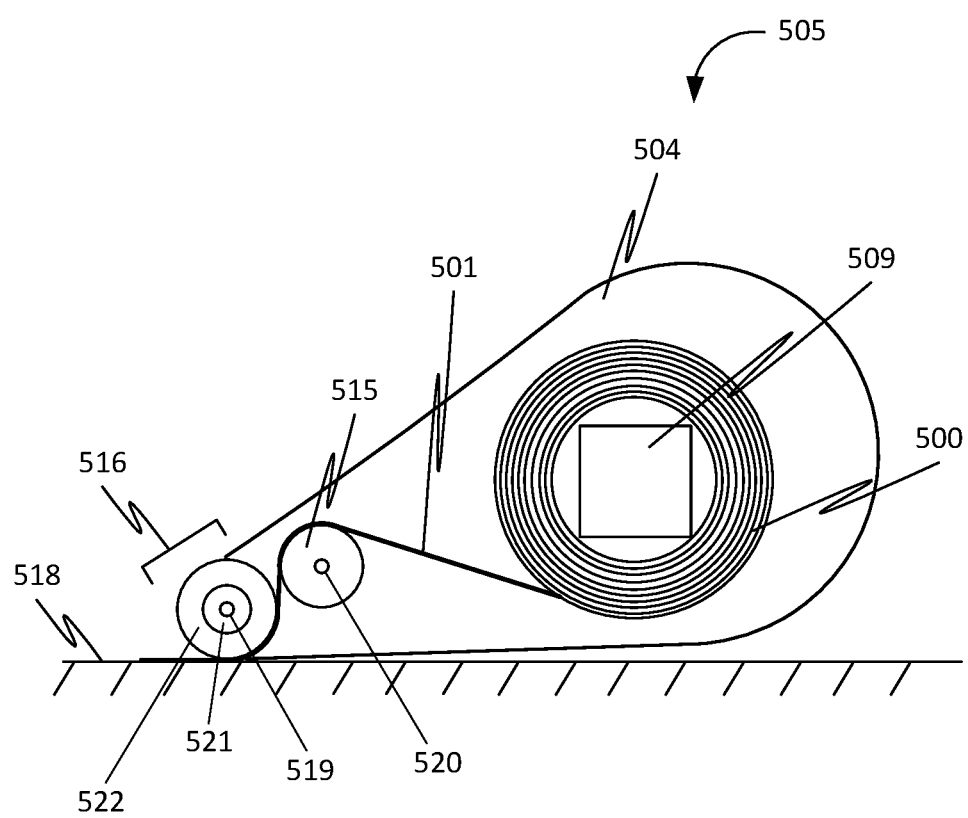
FIG. 5 illustrates an adhesive tape applicator according to an embodiment of the invention when applying adhesive tape to a substrate.

As described above, the adhesive tape applicator includes a roller apparatus. The adhesive roller apparatus applies the adhesive tape onto a substrate. Referring to FIG. 5, in some embodiments, the adhesive roller apparatus includes a pinch roll 515 and a transfer roll 516 adjacent to the pinch roll 515, wherein the pinch roll 515 and the transfer roll 516 are each rotatably engaged to the housing 504 and adapted to roll the adhesive tape 501 therebetween. The transfer roll 516 is engaged to the housing 504 via transfer roll shaft 519 and the pinch wheel 515 is engaged to housing 504 via pinch wheel shaft 520. The transfer roll 516 is adapted to apply the adhesive tape 501 to a substrate by rolling the transfer roll 516 on the substrate 518. Thus, an operator may dispense the adhesive tape 501 by rolling the adhesive tape 501 onto the substrate 518 using the transfer wheel 516 as the tape roll 500 rotates about the compressible tape hub 509. Then, when the operator wishes to cut the tape, the operator compresses the side of the housing 504, which compresses the tape hub 509 and allows the housing to frictionally or forcefully contact the adhesive tape roll 500, stopping the rotation. This creates a tension between the static adhesive tape roll 500 and the adhesive tape 501 being applied to the substrate 518. The operator may then twist or move the applicator 505 in a lateral direction, typically causing adhesive tape 501 to be torn between transfer roll 516 and substrate 518.

In some embodiments, the transfer roll 516 comprises a transfer roll core 521 and an applicator sleeve 522 thereon. The adhesive tape 501 will preferably have less affinity for the surface of the applicator sleeve 522 than it has for the substrate 518. In some cases, a silicone material is used on the surface of the applicator sleeve 522. The relative affinity of the adhesive for the substrate 518 over the applicator sleeve 522 can be enhanced by reducing the surface area of the applicator sleeve 522 by embossing ridges, dots, or grooves into the surface. In addition to balancing the adhesive's affinity for the applicator sleeve 522 and substrate 518, adhesion to the substrate 518 can be enhanced by using a compressible material for the applicator sleeve 522 that may result in the adhesive being more intimately embedded in the surface texture of the substrate 518.

Figure 6A:
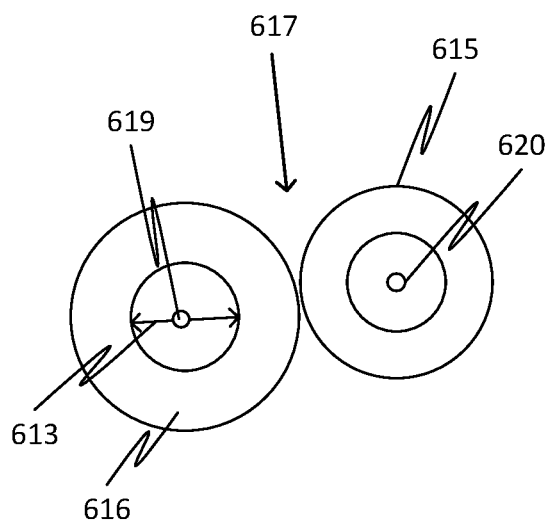
FIG. 6A illustrates a closed position between a pinch roll and a transfer roll in some embodiments of the invention.
Figure 6B:
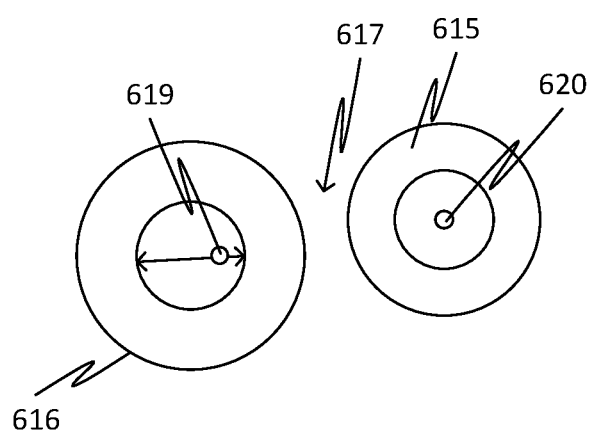
FIG. 6B illustrates an open position between a pinch roll and a transfer roll in some embodiments of the invention.

In some embodiments of the invention, the position of the transfer roll is moveable such that a distance between the pinch roll and the transfer roll may be varied. The radial movement closes or opens the nip point between the pinch and transfer rolls and facilitates loading the adhesive as it may be inconvenient to position the adhesive tape relative to the transfer roll while the pinch roll and transfer roll are closed. Being able to open the nip point allows the operator to position the adhesive tape properly before securing it to the transfer roll. FIGS. 6A and 6B illustrate positioning between a pinch roll 615 and a transfer roll 616. In some embodiments, the transfer roll 616 is capable of radial movement across a centerline of a shaft 619 to approach a pinch roll 615 or move away from pinch roll 615. Thus, the nip point 617 may be increased or decreased by change of this position. This may be accomplished by having sufficient clearance between the transfer roll shaft 619 and its bore 623. Alternatively, or additionally, a pinch roll shaft 620 may be able to move radially to approach or withdraw from the transfer roll 616.

In some embodiments of the invention, the applicator includes a pawl member in contact with a surface of the transfer roll. The pawl member may be a flexible pawl member that may contact the transfer roll so that the transfer roll is free to turn clockwise for dispensing the adhesive tape, but is prevented from rotating counterclockwise if the operator pushes the applicator rather than pulls it across the substrate. The pawl prevents misdirection of the adhesive tape and the possible consequences of it adhering to the interior of the applicator or completely wrapping around the transfer roll. This improves the function of the applicator by reducing the need to open the applicator to clean and rethread it. The pawl member will be discussed further with respect to FIG. 7 below.

In some embodiments of the invention, the roll of adhesive tape is a dual-sided adhesive tape and includes an adhesive liner releasably attached to one side of the dual-sided adhesive tape. In such embodiments, the adhesive tape applicator may further include a liner outlet, and a scraper adjacent to a nip point between the pinch roll and the transfer roll, wherein the scraper inserts between the liner and the adhesive on the tape to detach the liner and push the liner out of the housing through the liner outlet.

Figure 7:
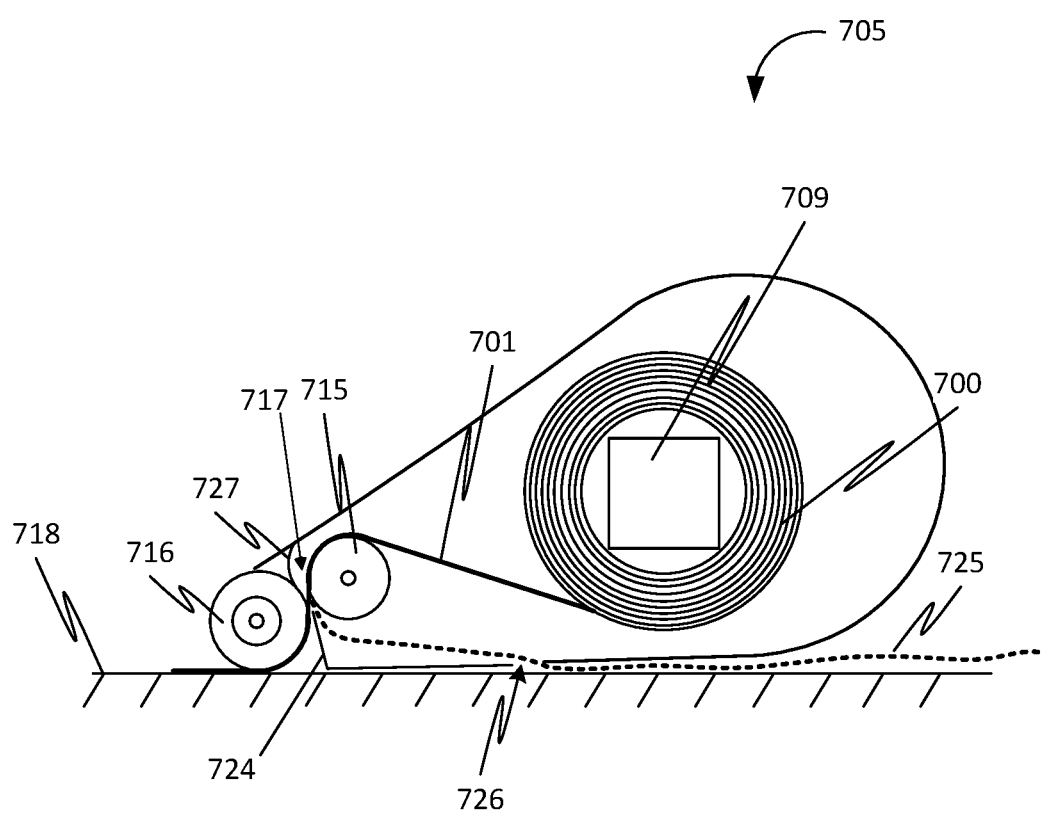
FIG. 7 illustrates an adhesive tape applicator according to an embodiment of the invention.

Referring to FIG. 7, a dual-sided adhesive tape applicator 705 is shown wherein an adhesive tape roll 700 is inserted onto a compressible tape hub 709, and a length of adhesive tape 701 is wound through the nip point 717 between the pinch roll 715 and the transfer roll 716. The scraper 724 is positioned adjacent to the nip point 717, so that when the adhesive tape 701 passes through the nip point 717, the scraper 724 peels the liner 725 away from the adhesive by virtue of the proximity of the scraper 724 to the adhesive and the relative stiffness of the liner 725. Furthermore, the liner 725 is generally not tightly bound to the adhesive so that the liner 725 can be readily detached by scraper 724. The adhesive tape 701 (with liner) is tracked around (or proximate to) a pinch roll 715 until the adhesive on the tape is pressed into contact with transfer roll 716, and the liner 725 is directed by scraper toward the liner outlet 726. When the transfer roll is pressed against a substrate 718, the adhesive is pressed against and thus applied to the substrate 718 while the expelled liner 725 exits the device through the liner outlet 726.

The scraper 724 may be used in some embodiments to improve the function of the applicator 705 with the dual-sided adhesive tape 701 by largely ensuring that the liner 725 separates as desired and is pushed to the liner outlet 726, also referred to as a vent, and out of the applicator reliably. If the liner 725 remained bonded to the adhesive and wrapped around the transfer roll 716, it may prevent the adhesive from being applied to the substrate 718 and would necessitate opening and rethreading the applicator 705 to correct the error. The scraper 724 may be any knife (including serrated or straight edged), blade, edge or other device that is able to detach the liner 725 from the tape adhesive. Also shown in FIG. 7 is a flexible pawl 727 bearing on the surface of transfer roll 716 in such a manner that the transfer roll 716 is free to turn clockwise for the dispensing of the adhesive tape 701, but is prevented from rotating counterclockwise if the operator pushes the applicator 705 rather than pulls it across the substrate 718.

Figure 8:
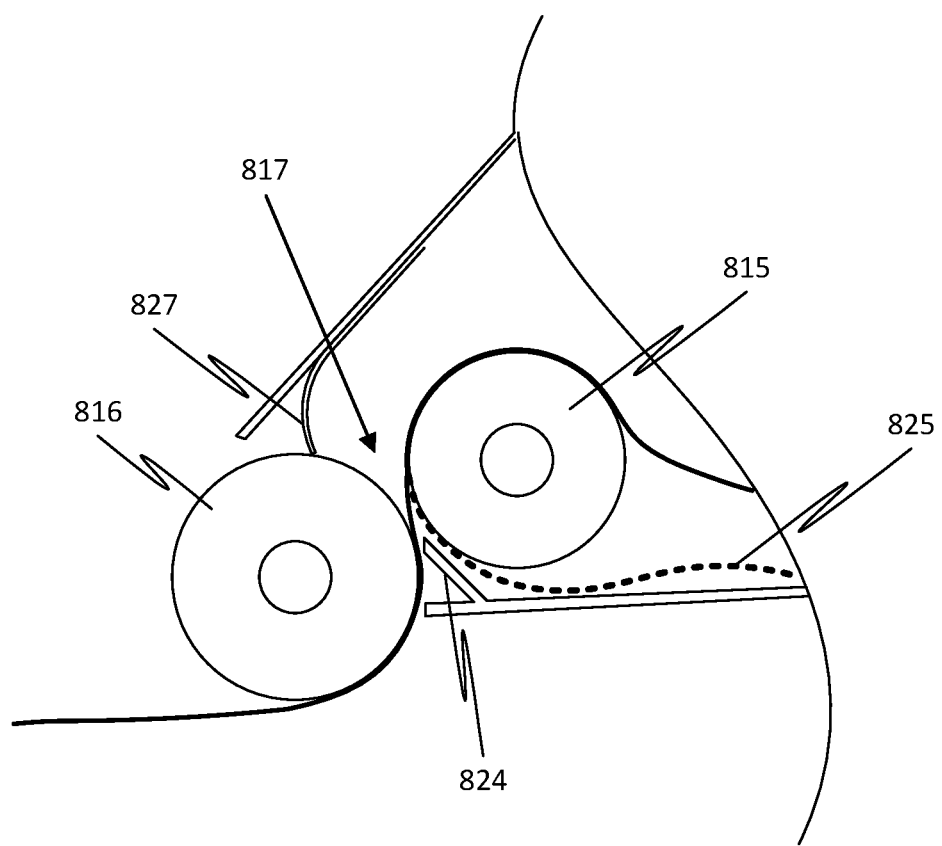
FIG. 8 illustrates a magnified view of a portion of an adhesive tape applicator according to an embodiment of the invention.

In some embodiments, transfer roll 716 can pinch the adhesive tape 701 and its liner 725 to the pinch roll 715 to cause sufficient adhesion of the tape 701 to the transfer roll 716 to overcome the adhesion of the tape 701 to liner 725. Furthermore, transfer roll 716 and pinch roll 715 may touch during adhesive application to the substrate 718 so the motive force of the turning transfer roll 716 can be imparted to the liner 725 so it can rotate the roll of adhesive tape 700 in the applicator 705. If the nip point 717 between the pinch roll 715 and transfer roll 716 is open, the adhesive tape 701 may separate in tension and the applicator 705 may fail to apply a continuous length of adhesive tape 701 to the substrate 718. FIG. 8 provides a magnified view of the nip point 817 between the pinch roll 815 and transfer roll 816. Scraper 824 and pawl member 827 are also more clearly illustrated. Scraper 824 is adjacent to the nip point 817 and acts to detach liner 825 from the adhesive tape 801 and direct it toward the liner outlet (not shown).

Figure 9:
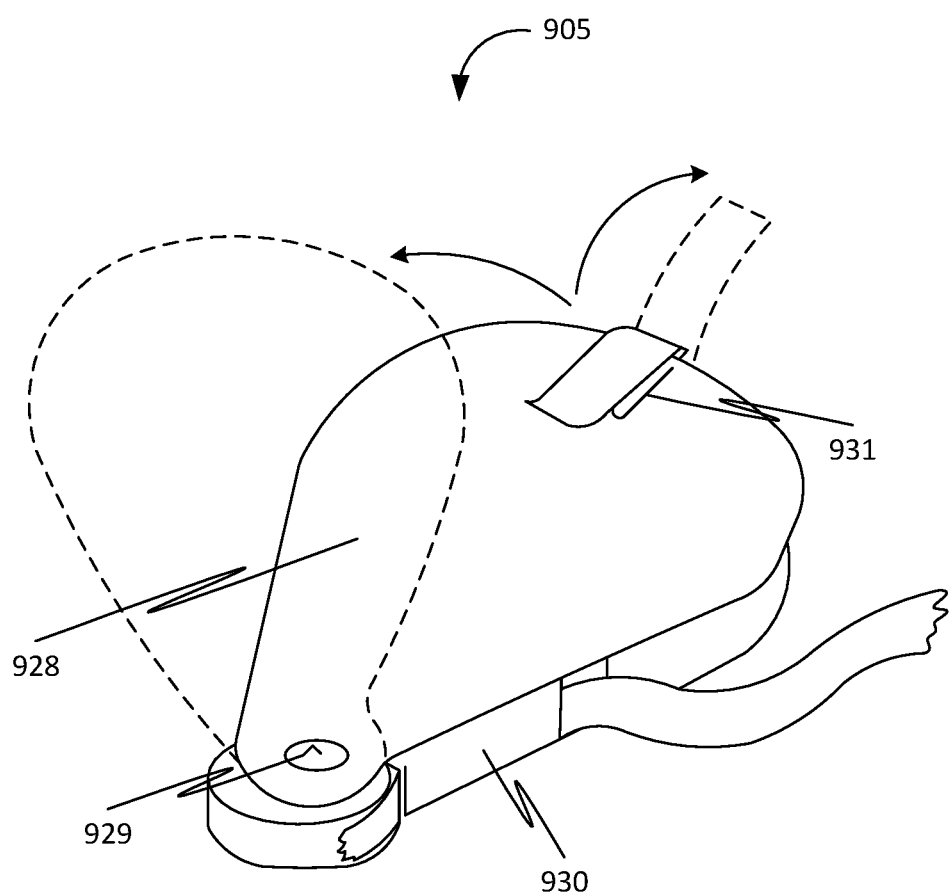
FIG. 9 illustrates one example of an applicator with a pivoting cover member according to an embodiment of the invention.

As described above, in some embodiments of the invention, the adhesive tape applicator may include a cover member that secures to a base member. Any configuration of cover and base members that allows an adhesive tape roll to be inserted into the applicator may be used, and in some cases, the applicator could be inserted via a sidewall opening or other exposed area within the housing. However, in certain embodiments, all or part of a face of the tape adhesive applicator may be removable or displaceable in order to allow for the adhesive tape roll be inserted into the applicator. One example is shown in FIG. 9. The cover member 928 of applicator 905 includes a pivot element 929, whereby the cover member 928 is secured to the base member 930 by the pivot element 929. The cover member 928 may swing clockwise or counterclockwise to expose the cavity (not shown) of the housing, and wherein when the cover member 928 is swung to the closed position, it may be secured by a magnet, a spring catch or other securing means in the closed position over the body of the applicator. Referring to FIG. 9, in some cases, the securing means may be a hook and loop tab 931. Other devices may also be effective depending on the manufacture of the individual parts and the labor the manufacturer is willing to commit to assembly. Some of these alternate configurations include: a) shoe-box fit of body and cover, wherein the cover member frictionally secures over the top of the base member; b) captive screw(s) that engage a threaded hole in the base member; c) spring detent pins; and d) thumb nuts on threaded studs through holes or a slot allowing the cover to pivot.

Figure 10:
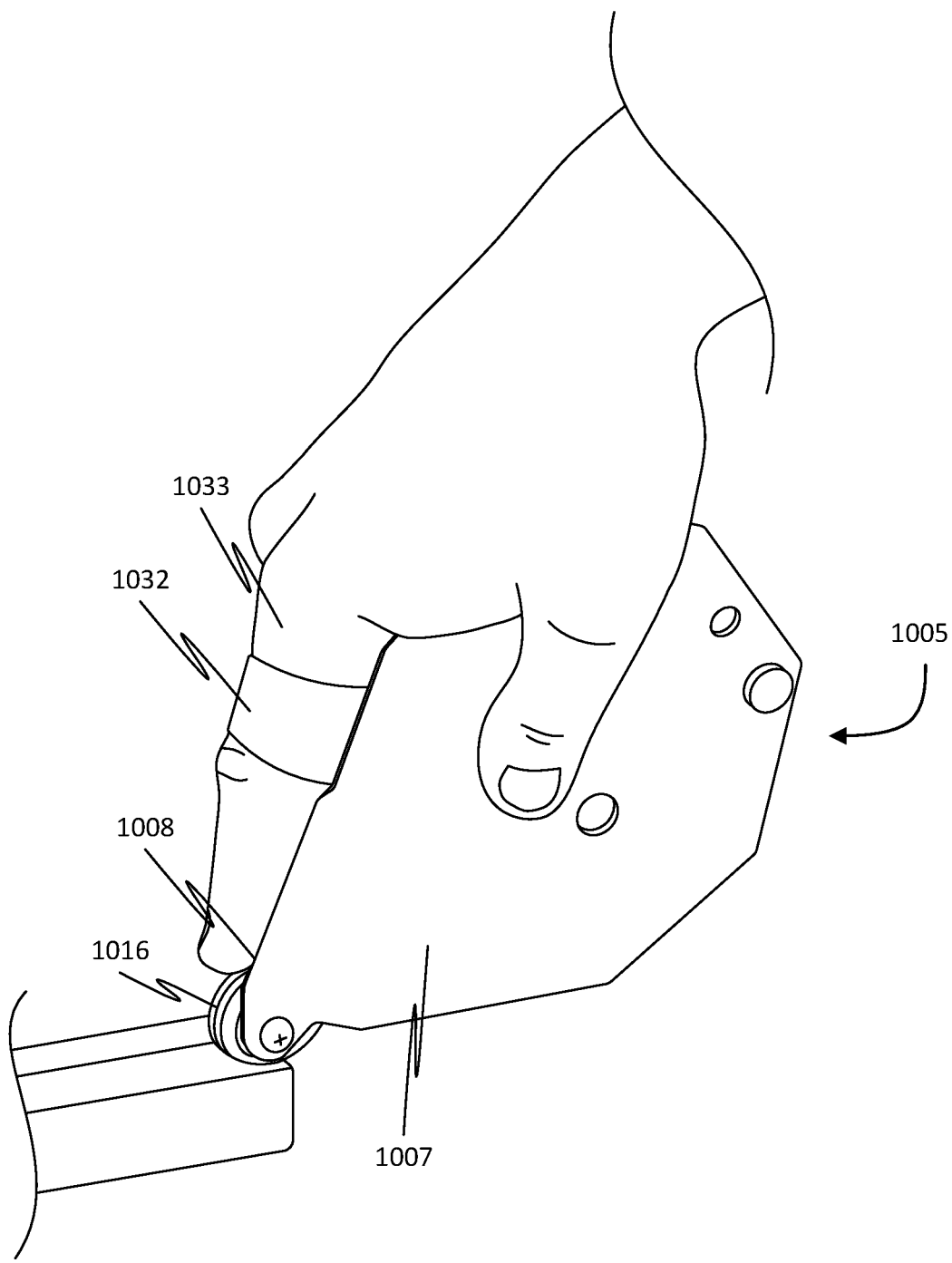
FIG. 10 illustrates a finger sleeve on an applicator according to an embodiment of the invention.

The external surfaces of the housing may also include means of gripping the adhesive tape applicator. As described above, the housing may itself be shaped to facilitate grip by an operator's hand. However, the external surfaces of the housing may further have grips, roughened or textured surfaces, foam or other gripping material. This may be particularly useful on the two faces of the applicator. In addition, in some embodiments, a finger sleeve may be included on a sidewall of the housing. Referring to FIG. 10, in some embodiments, a finger sleeve device 1032, such as the adjustable hook and loop sleeve, may attached to a sidewall 1008, and in particular, a sidewall 1008 above the transfer roll 1016. When grasping an object with the index finger 1033 extended, grip is naturally accomplished by squeezing the applicator between the thumb and remaining fingers. However, this natural grip is contrary to the use of the applicator 1005 whereby squeezing the applicator stops the adhesive roll (not shown) from turning. A sleeve 1032 over the index finger 1033 allows the entire weight of the applicator 1005 to be carried by the index finger 1033, reducing the dependence on squeezing to hold the applicator 1005. The sleeve 1032 also positions the index finger 1032 in the optimum position to apply the amount and direction of force necessary to efficiently apply the adhesive to the substrate and to effectively twist and pull the applicator to tear the adhesive when desired. The sleeve 1032 and its function in the use of the applicator 1005 could also be accomplished by a sheet metal hook or encircling loop, a wire ring, a flexible split ring of molded plastic that would accommodate a range of finger sizes, and the like. Any means of securing the index finger (or even middle finger) to the applicator sidewall could be used.

Also provided according to embodiments of the invention are methods of using the adhesive tape applicators of the invention. In some embodiments, methods of applying adhesive tape include gripping a first face and a second face of the housing with a hand; rolling a length of adhesive tape onto a substrate with the transfer roll; compressing the outer face of the housing to frictionally or forcefully contact the roll of adhesive tape, thereby halting rotation of the roll of the adhesive tape; and applying a lateral motion to the adhesive tape applicator to create a lateral force on the adhesive tape, thereby tearing the length of adhesive tape on the substrate from the roll of adhesive tape. Methods may further include the step of threading the length of adhesive tape from a roll of adhesive tape through the pinch roll and transfer roll of the adhesive tape applicator and inserting the roll of adhesive tape into the adhesive tape applicator prior to use.

Figure 11:
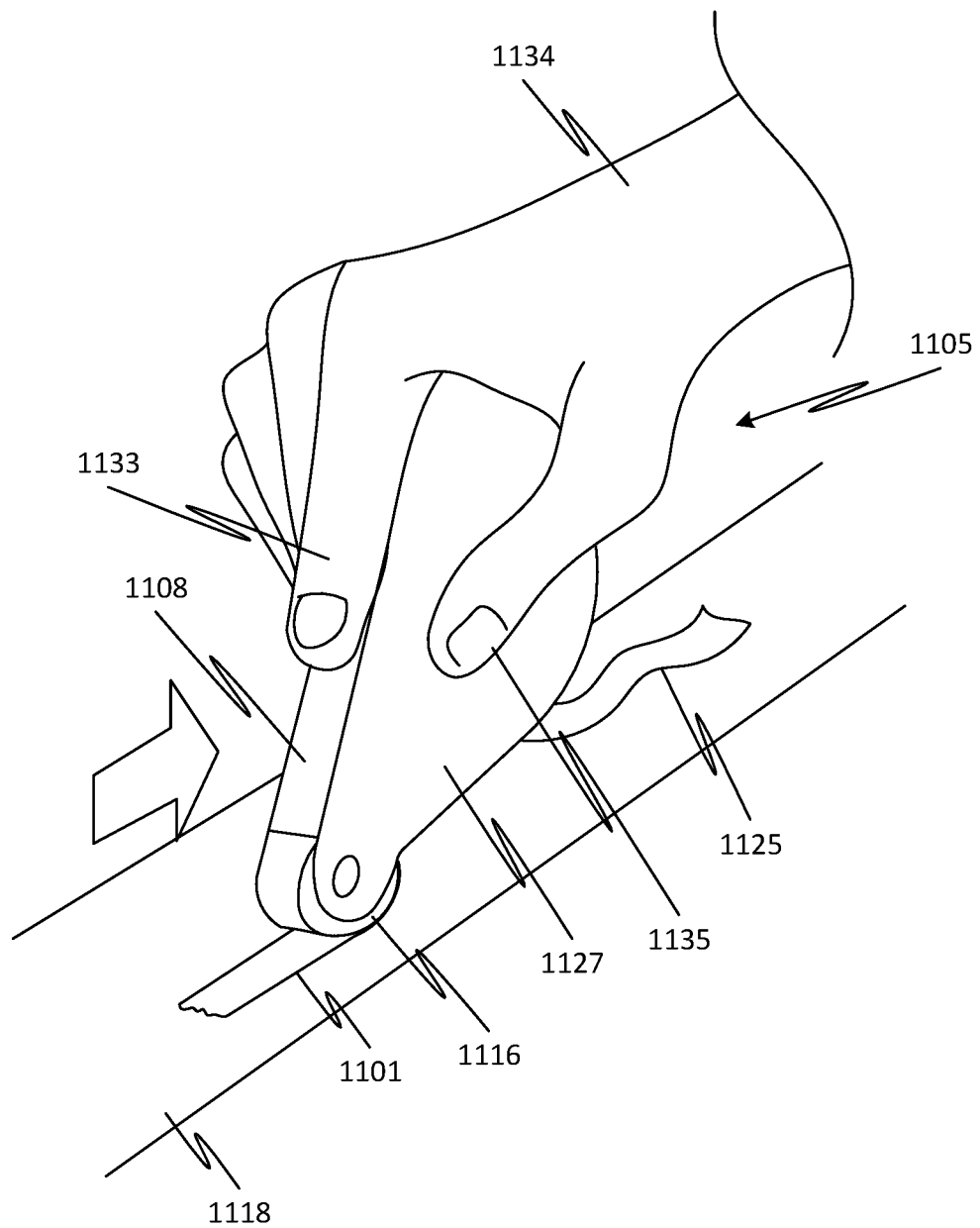
FIG. 11 illustrates a method of using an applicator according to an embodiment of the invention.

FIG. 11 illustrates the use of an assembled device according to an embodiment of the invention. Here, the applicator 1105 is held by one hand 1134 whereby the index finger 1133 applies force to the interface of the adhesive tape 1101 and substrate 1118 via the sidewall 1108 of applicator 1105 and the transfer roll 1116. The squeezing/compression of the applicator 1105 to stop the adhesive application and tear off the tape 1101 is applied by the thumb 1135 and remaining fingers (not shown) as the expelled liner 1125 exits via the liner outlet (not shown).

An advantage of an applicator according to the present invention is the simplicity of its design and elimination of unnecessary parts, which thereby reduces the cost of manufacture and increases the ease of use of the applicator. In the following sections, detailed descriptions of examples and methods of the disclosure will be given. The description of both preferred and alternative examples though, are exemplary only, and it is understood that to those skilled in the art that variations, modifications, and alterations may be apparent. It is therefore to be understood that the examples do not limit the broadness of the aspects of the underlying disclosure as defined by the claims.

What is claimed is:

1. A method of dispensing a length of adhesive tape onto a substrate, the method comprising the steps of:
  a) threading the length of adhesive tape from a roll of adhesive tape through a pinch roll and a transfer roll of an adhesive tape applicator and inserting the roll of adhesive tape into the adhesive tape applicator, wherein the adhesive tape applicator comprises:
    a housing comprising a cavity adapted to contain the roll of adhesive tape, the cavity comprising an inner face, and outer face, and at least one sidewall connecting the inner face and outer face;
    a compressible tape hub attached to an inner surface of the inner face of the cavity and configured to rotatably support the roll of adhesive tape and extend through the roll of adhesive tape to forma compressible protrusion extending from the roll of adhesive tape, wherein the adhesive tape is a dual-sided adhesive tape that comprises a liner releasably attached to one side of the dual-sided adhesive tape;
    the pinch roll, and the transfer roll adjacent to the pinch roll, wherein both the pinch roll and transfer roll are attached to the housing and configured to hold the adhesive tape therebetween, and wherein the transfer roll is configured to adhere the adhesive tape to the substrate by rolling the adhesive tape off of the transfer roll and onto the substrate; and
    a liner outlet, and a scraper adjacent to a nip point between the pinch roll and the transfer roll, wherein the scraper inserts between the liner and an adhesive of the adhesive tape to detach the liner from the adhesive and push the liner out of the adhesive tape applicator housing through the liner outlet;
  b) gripping the inner face and the outer face of the housing with a hand;
  c) rolling a length of the adhesive tape onto the substrate with the transfer roll;

d) compressing the outer face of the housing to frictionally or forcefully contact the roll of adhesive tape, thereby halting rotation of the roll of the adhesive tape; and e) applying a lateral motion to the adhesive tape applicator to create a lateral force on the adhesive tape, thereby tearing the length of adhesive tape between the transfer roll and the substrate.

2. The method of claim 1, wherein the compressible tape hub comprises a polymer foam.

3. The method of claim 1, further comprising a pawl member in contact with a surface of the transfer roll.

4. The method of claim 1, wherein a position of the pinch roll relative to the transfer roll may be varied.

5. The method of claim 1, wherein the transfer roll comprises a transfer roll core and an applicator sleeve thereon.

6. The method of claim 5, wherein the applicator sleeve comprises a silicone surface.

7. The method of claim 5, wherein the applicator sleeve comprises ridges, grooves, or protrusions on a surface thereof.

8. The method of claim 1, further comprising a finger sleeve on a sidewall of the housing.

9. The method of claim 1, further comprising a gripping member on at least one face of the housing.

10. The method of claim 1, wherein the housing comprises a removeable cover member.

\* \* \* \* \*